3,346,653
PROCESS FOR DEHYDROHALOGENATION
Eugene F. Lutz, Concord, Calif., and Stephen W. Beatty, New York, N.Y., assignors to Marathon Oil Company, Findlay, Ohio, a corporation of Ohio
No Drawing. Filed Jan. 3, 1966, Ser. No. 517,980
9 Claims. (Cl. 260—666)

ABSTRACT OF THE DISCLOSURE

The present invention comprises a process for the dehydrohalogenation of non-aromatic hydrocarbon halides in which not more than about 50% of the bonds are unsaturated and which contain from 2 to about 20 carbon atoms by contacting the hydrocarbon halides with a media comprising a major portion of N-alkyl-pyrrolidone containing from 1 to about 12 carbon atoms in the alkyl group, and with a halide catalyst to form a reaction mixture and heating said reaction mixture to from about 25 to about 300° C. whereby said HCl can be recovered without neutralization.

---

The present invention relates to new processes for the dehydrohalogenation of hydrocarbon halides and in particular refers to processes for the dehydrohalogenation of such hydrocarbon halides in the conjoint presence of a halide catalyst and an N-alkyl pyrrolidone.

The term hydrocarbon halides as used herein includes the iodides, bromides, fluorides, and most preferably the chlorides of hydrocarbon groups having two or more and most preferably from two to about 20 carbon atoms comprising straight chain hydrocarbon groups, cyclic hydrocarbon groups, and excluding aromatic halides. Saturated hydrocarbon groups are preferred, but unsaturation of up to about 50%, or more desirably up to about 25% of the bonds in the hydrocarbon group, can, in general, be permitted.

It should be understood that the hydrocarbon halides suitable for use with the present invention may be substituted with any non-interfering organic substituting groups which do not cause deleterious side reactions, e.g., nitro groups, etc. Such hydrocarbon halides can also contain mono- or polynuclear aromatic rings without interference with the reaction of the present invention in most instances. The most preferred hydrocarbon halide is chlorocyclohexane.

While the present invention will be satisfactory with certain compounds at room temperature, temperatures of from about 25 to about 300° C. will be preferred with care being taken not to exceed decomposition temperatures of either the starting materials or the products produced. Especially preferred will be temperatures which are below the boiling point of the hydrocarbon halide starting material and above the boiling point of the dehydrohalogenation product under the reaction pressure. Such temperatures permit the continuous removal of the product by distillation. Pressure is not narrowly critical and pressures above atmospheric can be used to permit reaction at higher temperature.

The reaction is to be conducted under substantially anhydrous conditions and the N-alkyl pyrrolidone is preferably dried by distillation from calcium hydride or by other suitable means. Pressure is not narrowly cirtical and is preferably approximately atmospheric. The N-alkyl pyrrolidone will preferably contain from 1 to about 12 and most preferably from 1 to 6 carbon atoms in the alkyl group. N-methylpyrrolidone is especially preferred because of its ready availability.

It should be noted that the selection of media for the present invention is unexpectedly critical and that dimethylformamide, a commonly used strong aprotic solvent which is often equated with N-methyl- and other N-alkyl pyrrolidones is not satisfactory for the process of the present invention because it undergoes an uneconomic cleavage. This cleavage requires that the relatively expensive dimethylformamide be replenished and greatly increases the cost of conducting the reaction.

The reaction is preferably conducted in the presence of from about 1.0 to about 100.0 and most preferably from 4.0 to 10.0 moles of solvent per mole of hydrocarbon halide. The N-alkyl pyrrolidone is preferably the only solvent present, but it may be diluted preferably with not more than about 25% of an inert aprotic solvent such as a benzene or other stable solvent which does not undergo deleterious side reactions and which is liquid under the conditions of the reaction.

The halide catalysts used for the present invention can be iodides, bromides, chlorides, or fluorides, with chlorides being preferred. Any cation may be used with the halide anions so long as the resulting compound is soluble in the reaction mixture and so long as the compound does not undergo undesirable side reactions with the other ingredients in the mixture to any substantial extent. Both mono- and polyhalides may be utilized. The preferred halide catalysts for the reactions of the present invention comprise the halides of lithium, iron, hydrogen, aluminum, magnesium, titanium, silicon, zinc, boron, beryllium, LiBr, tetraalkyl ammonium halide, $NH_4Br$, $NH_4Cl$, and most preferably lithium chloride. The halide catalyst will preferably be present in quantities of from about 0.01 to about 5.0 and most preferably from 0.5 to about 1.5 moles of halide catalyst per mole of hydrocarbon halide starting material.

In especially preferred embodiments of the present invention, the halide catalyst is HCl and it is introduced into the reaction mixture in the form of the hydrochloride of N-methyl pyrrolidone (NMP·HCl). The hydrochloride of N-methyl pyrrolidone (or of most of its alkyl derivatives) has a melting point within the above-mentioned preferred temperature range and the reaction may, therefore, be conducted using molten NMP·HCl as the reaction media. (See Example IV.) In this embodiment, HCl is evolved as the dehydrochlorination progresses and this by-product, HCl may be captured in the economically valuable anhydrous state, thus avoiding the production of the lower valued aqueous solutions of HCl, more commonly produced in dehydrohalogenation reactions. In addition, the NMP·HCl is continuously regenerated and there is no need to add additional quantities of HCl during normal operation of this embodiment of the invention.

The dehydrohalogenation products of the present invention are unsaturated hydrocarbons which are useful as starting materials for a variety of organic reactions including homo- and co-polymerization and conventional substitution reactions.

The invention is more fully understood by reference to the following examples which are to be taken as illustrative and as in no way limiting the scope of the invention.

EXAMPLE I

To a solution of 5 g. (.042 mole) chlorocyclohexane in 25 ml. (0.24 mole) N-methylpyrrolidone (dried by distillation from calcium hydride) is added 1.7 g. (.04 mole) lithium chloride (dried at 300° C.). The reaction is carried out in a three-neck round bottom flask equipped with stirrer, thermometer, and reflux partial condenser. The volatile products are trapped in a Dry Ice trap protected by a mineral oil bubbler. The above reaction mixture is heated to 135° C. with stirring under a nitrogen atmosphere. The product cyclohexene is distilled as it is formed and a total of 2.3 g. of cyclohexene (corresponding to a theoretical yield of 65.7%) is recovered in a period of about 17 hours.

EXAMPLE II 5.1 g. chlorocyclohexane, 25 ml. N-methylpyrrolidone (dried by distillation from calcium hydride) are mixed together and treated as in Example I for a period of about 23 hours. During this period a total of about 0.4 g. (corresponding to a theoretical yield of about 11.4%) is collected. When compared with Example I above, this illustrates the greatly enhanced yields produced by the presence of the metal halide.

EXAMPLE III

According to the procedures of Example I, 5 g. chlorocyclohexane, 1.7 g. lithium chloride (dried at 300° C.) 24 ml. dimethylformamide (DMF) distilled from calcium hydride are mixed together and heated for approximately 6.5 hours. During this time, 2.4 g. of cyclohexane is collected, but the reaction mixture is thereafter found to contain crystals melting at from 161–165° C. which are shown by infrared analysis to be N,N-dimethylamine hydrochloride. This indicates the decomposition of dimethylformamide (DMF) during the course of the dehydrohalogenation reaction to form as co-products N,N-dimethylamine hydrochloride and carbon monoxide, with consequent need for replenishing the expensive DMF media.

EXAMPLE IV 2.30 g. (0.0194 mole) chlorocyclohexane and 14.7 g. (0.109 mole) N-methyl pyrrolidone·HCl salt are transferred into an apparatus similar to that used in Example I and heated at 130° C. with stirring for 5 hours during which HCl is evolved. At the end of that time, 0.2372 g. of a product having an index of refraction ($n_D$) of 1.4488 has been collected. After 17 additional hours at the same temperature another 0.2775 g. of a product having an index of refraction ($n_D$) of 1.4440 is collected. Pure cyclohexene has an index of refraction of 1.4450. Infrared analysis run individually on each fraction indicates cyclohexene. The weight of the reaction flask residue is 18.4440 g. and this residue is worked up with ether and recrystallized from an acetone/ether mixture containing about 50% acetone by volume. The ether wash is evaporated and the residue is examined and found to be principally NMP·HCl. The expected theoretical yield of cyclohexene is 1.6 g. The actual yield was 0.51 g. or 31.8% of theoretical.

What is claimed is:

1. A process for the dehydrohalogenation of non-aromatic hydrocarbon halides in which not more than about 50% of the bonds are unsaturated and which contain from 2 to about 20 carbon atoms by contacting the hydrocarbon halides with a media comprising a major portion of N-alkylpyrrolidone containing from 1 to about 12 carbon atoms in the alkyl group, and with a halide catalyst to form a reaction mixture and heating said reaction mixture to from about 25 to about 300° C. whereby said HCl can be recovered without neutralization.

2. The process of claim 1 wherein the halide catalyst is selected from the group consisting of: halides of lithium, iron, hydrogen, aluminum, magnesium, titanium, silicon, zinc, boron, and beryllium.

3. The process of claim 2 wherein both the halide catalyst and the alkyl halide are chlorides.

4. The process of claim 3 where halide catalyst is lithium chloride.

5. The process of claim 4 wherein the reaction is conducted at a temperature below the boiling point of the alkyl chloride, but above the boiling point of the dehydrohalogenation product.

6. The process of claim 1 wherein the non-aromatic hydrocarbon halide is the monochloride of an alkane having from 2 to about 12 carbon atoms.

7. The process of claim 6 wherein the monochloride is chlorocyclohexane.

8. The process of claim 6 wherein the highly dielectric media comprises a major portion of the hydrochloride salt of the N-alkyl pyrrolidone.

9. The process of claim 8 wherein the N-alkyl pyrrolidone is N-methyl pyrrolidone.

References Cited

UNITED STATES PATENTS

| | | | |
|---|---|---|---|
| 2,164,334 | 7/1939 | Marks | 260—677 |
| 2,385,555 | 9/1945 | Voge | 260—666 |
| 2,596,102 | 5/1952 | Rickert | 260—666 |
| 2,899,473 | 8/1959 | Le Prince | 260—666 |
| 3,082,261 | 3/1963 | Fust | 260—666 |
| 3,093,693 | 6/1963 | Perry | 260—666 |
| 3,108,143 | 10/1963 | Tallman | 260—666 |
| 3,227,766 | 1/1966 | Kruse | 260—666 |

DELBERT E. GANTZ, *Primary Examiner.*

V. O'KEEFE, *Assistant Examiner.*